United States Patent [19]

Ruey-Guang

[11] Patent Number: 4,887,294
[45] Date of Patent: Dec. 12, 1989

[54] TELEPHONE AUTOMATIC REDIAL SYSTEM

[75] Inventor: Wu Ruey-Guang, Miao-Li Hsien, Taiwan

[73] Assignee: Industrial Technology Research Institute, Taiwan

[21] Appl. No.: 195,877

[22] Filed: May 19, 1988

[51] Int. Cl.$^4$ .............................................. H04M 1/26
[52] U.S. Cl. .................................. 379/355; 379/359; 379/216
[58] Field of Search ............... 379/355, 354, 359, 362, 379/216, 352

[56] References Cited

U.S. PATENT DOCUMENTS

| | | | |
|---|---|---|---|
| 3,665,113 | 5/1972 | Blake et al. | 379/359 |
| 3,792,203 | 2/1974 | Martin | 379/355 |
| 4,143,243 | 3/1979 | Sutton | 379/355 |
| 4,209,668 | 6/1980 | Weinberger et al. | 379/355 |
| 4,737,984 | 4/1988 | Brown | 379/355 |

Primary Examiner—Jin F. Ng
Assistant Examiner—Wing F. Chan
Attorney, Agent, or Firm—Cahill, Sutton & Thomas

[57] ABSTRACT

An automatic redialing system for a telephone utilizing a conventional call progress decoder and a conventional redial memory. The system utilizes logic circuitry with gates that can be economically fabricated as CMOS transistor integrated circuits. The circuitry has two circuits. One circuit, called a redial initiation circuit, is responsive to a dial tone signal from the call progress decoder to signal the redial memory to redial the number stored therein. The other circuit, called a redial interrupt circuit, is responsive to a busy tone signal from the call progress decoder for signaling an interruption to the redial sequence. The latter circuit includes a timer for temporarily interrupting the dialing sequence for predetermined periods of time and a counter for interrupting the redialing sequence after a number has been redialed a predetermined number of times.

3 Claims, 1 Drawing Sheet

TELEPHONE AUTOMATIC REDIAL SYSTEM

TECHNICAL FIELD

This invention is concerned with a telephone communication system in which provision is made for automatic reaccess to a previously dialed busy station.

BACKGROUND ART

There are commercially available today telephone instruments for both business and residential use which enable a user to automatically and repeatedly redial a number when a busy signal has been obtained for that number. The redialing system for such an instrument generally comprises three principal components; a call progress decoder, a redial memory and a microprocessor for interacting between the decoder and the memory to cause the memory to redial the desired number at appropriate intervals.

A call progress decoder monitors the tones transmitted over the telephone line so as to distinguish between and generate unique output signals upon detecting a dial tone signal, a ringing signal, a reorder signal and a busy signal. Certain decoders distinguish the various tones on the basis of tone frequency while others respond to the timing of interruptions of the various tones. In either case, the call progress decoders are usually comprised of packaged CMOS transistor integrated circuits which are both small in size and relatively inexpensive.

The redial memory system also can be obtained inexpensively in package form.

The microprocessor used to interrelate the decoder and the memory often is of considerable complexity and can be costly. Indeed, the cost of the microprocessor places the automatic redialing system out of the reach of many ordinary residential telephone owners.

The present invention eliminates the necessity for using a microprocessor in an automatic redialing system by substituting therefor a simple digital logic circuit.

DISCLOSURE OF THE INVENTION

This invention utilizes a first circuit including a transmission gate switch responsive to a dial tone output signal from the call progress decoder to signal the redial memory to initiate a dial signal over the telephone line. The redial signal can be either the tone variety or the pulse variety depending upon the telephone system requirements. This first circuit is referred to hereinafter as a redial initiation circuit.

The invention also utilizes a second circuit of logic gates, again including transmission gates, to responsd to a busy tone output signal from the call progress decoder and to disconnect the redial memory and interrupt the redialing activity. In other words, this latter circuit effects the equivalent of an "on hook" placement of the hand-held telephone instrument on its cradle to interrupt access to the called telephone's circuit. This second circuit is referred to hereinafter as a redial interrupt circuit.

The redial interrupt circuit includes timer means for measuring the length of time the redial operation is interrupted following detection of a business busy signal. When the timer means determines that an "on hook" condition for the telephone circuit has existed for a predetermined length of time the timing means initiates an "off hook" condition to permit redialing under control of the redial initiation circuit.

The redial interrupt circuit further includes counter means for counting the number of times a particular number has been redialed. Government regulations prohibit a number from being redialed more than fifteen times. The counter means assures that this limit will not be exceeded by locking the redial memory out of the telephone line, i.e. placing it in an extended "on hook" condition, after the same number has been redialed the predetermined number of times.

Both the redial initiation circuit and the redial interrupt circuit are comprised in large measure of a few transistorized logic gates and can be produced economically, certainly at lower cost than the microprocessors formerly used.

BRIEF DESCRIPTION OF THE DRAWING

The invention is described in greater detail hereinafter by reference to the accompanying drawing wherein.

BEST MODE FOR CARRYING OUT THE INVENTION

Figure 1:
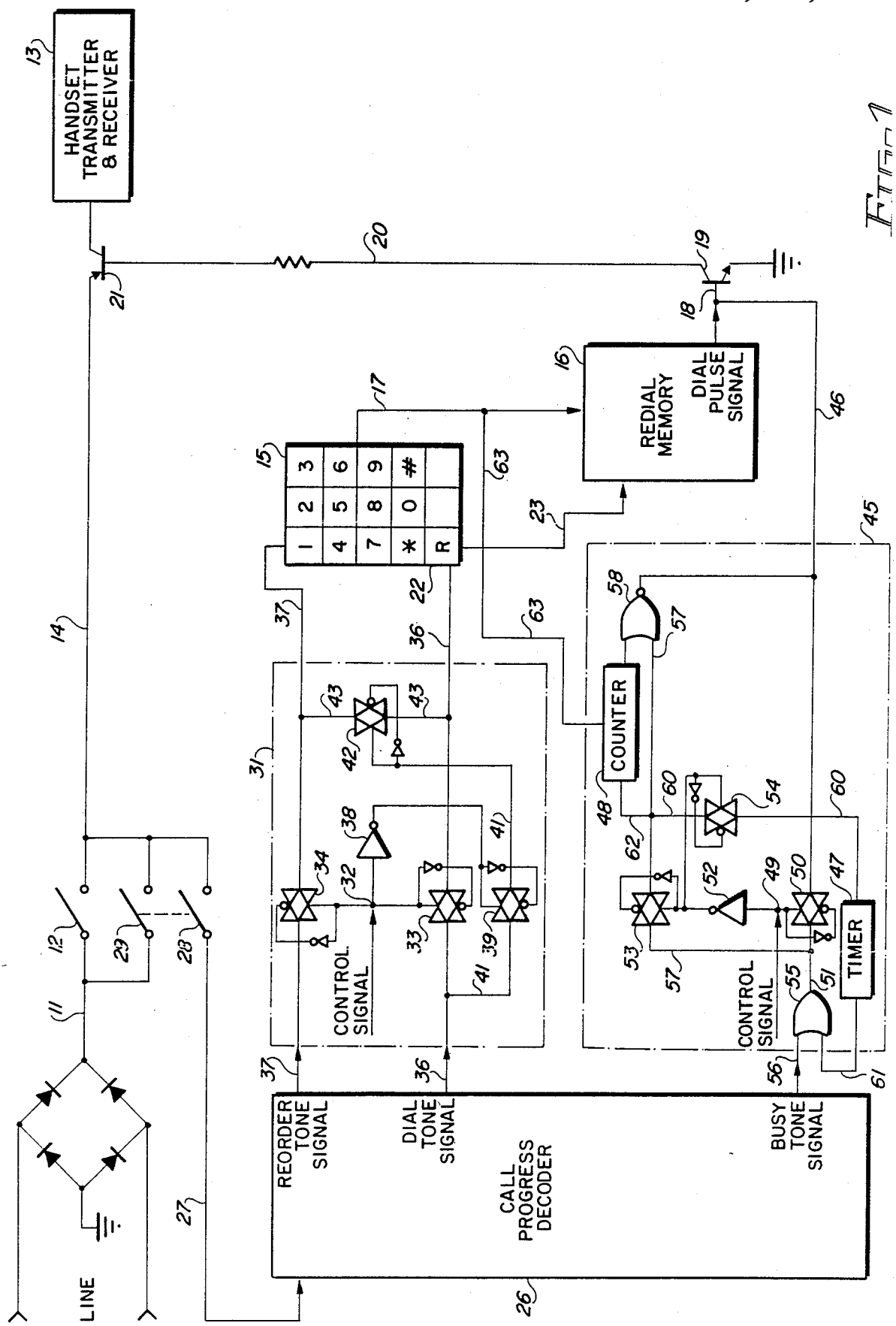
FIG. 1 is a schematic circuit partly in functional block diagram form illustrating the invention.

Referring to the drawing, the numeral 11 designates a conventional telephone line connected to the switching circuitry of the telephone service company. Contained within the telephone instrument is a handset operated switch 12 capable of connecting and disconnecting the instrument (represented by block 13) to and from the line 11 via line 14. Switch 12 is closed when the handset is removed from its cradle establishing an "off hook", or "on line", condition. Switch 12 is opened when the handset is replaced in its cradle establishing an "on hook", or "off line", condition.

In conventional operation of the telephone instrument a user lifts the handset 13 from its cradle and listens for a dial tone. When a dial tone is detected the user proceeds to institute dialing signals by pressing appropriate buttons on the telephone keyboard 15. Older pulse dialing systems may be employ a rotary dialing mechanism. With either system the dialing instructions are transmitted to a redial memory 16 via line 17.

Redial memory 16 is capable of passing on a dialed number while at the same time storing that number so that it can be recalled and redialed if desired. Redial memories are commercially available as packaged CMOS transistor circuits, such as the pulse dialer Model S2560A available from American Microsystems, Inc.

Redial memory 16 emits a dialed pulse signal over line 18 to the base of a switching transistor 19. Transistor 19 has its collector connected via line 20 to the base of another switching transistor 21 in line 14. Transistors 19 and 21 are normally "ON" to provide a closed circuit path for dial pulse signals from redial memory 16, over line 14, through closed switch 12 to telephone company line 11.

If the circuit to their dialed number is busy a "busy" signal is conveyed from the telephone company switching station over line 11 to handset 13. The user than must hang up, i.e. create an "on hook" condition, opening switch 12. The user can repeat the dialing sequence at some later time. Many modern telephones have a redial button 22 in keyboard 15 to enable the user to signal redial memory 16 over line 23 to redial the last number stored in the memory. This feature reduces the burden of the user in that he does not have to input the entire redial number into keyboard 15.

This invention is concerned with further reducing the burden of a user who has received a busy signal on the last number he has dialed. The invention incorporates into the telephone instrument a system for automatically redialing the busy number at periodic intervals until a ringing signal is obtained or the allowable number of redial operations have been performed.

This automatic redialing system employs a call progress decoder 26 which is capable of, in effect, listening to the various tone signals transmitted back to the caller over line 11 from the telephone company's switching facility and generating signals corresponding to the tone signal it hears. For example, most call progress decoders are capable of distinguishing between and generating different output signals upon detecting a dial tone signal, a ringing signal, a recorder signal, and a busy signal.

There are available on the market a number of packaged CMOS transistor circuits capable of fulfilling the function of call progress decoder 26. One example of such a device is sold by Teltone Corporation as their M-981 Precise Call Program Tone Detector. Call progress decoder 26 receivees its input from telephone line 11 over line 27 which includes a call progress decoder switch 28 connected in series with a redial control switch 29. Switches 28 and 29 are linked, preferably mechanically, so that when switch 29 is closed to initiate the automatic redial sequence, switch 28 is closed to connect cell progress decoder to line 11.

It will be noted that automatic redial switch 29 is in parallel with line switch 12 and is capable of shunting signals around the latter switch when switch 29 is closed. Thus, the automatic redial sequence can be instituted and carried out even with the handset in an "on hook" position in which it opens switch 12.

When a caller detects a busy signal in his handset he normally replaces the handset on its cradle, later lifts the handset and then redials the number either in its entirety or utilizes redial button 22 on keyboard 15 to instruct redial memory 16 to send out a dial pulse signal corresponding to the number. With the present invention this redialing sequence can be carried out and repeated automatically when the caller simply closes automatic redial switch 29 and decoder switch 28.

Initiation of the automatic redialing sequence is accomplished by a redial initiation circuit indicated generally by dot and dash line box 31. The purpose of redial initiation circuit 31 is to close the circuit through redial button 22 in keyboard 15 when the circuit is provided with a dial tone signal from the call progress decoder 26. This redial initiation circuit is maintained in a ready, or ON, state by input of a LO voltage level control signal at node 32. This control signal goes to transmission gates 33 and 34 which are disposed, respectively, in a dial tone signal line 36 from call progress decoder 26 to dial keyboard 15 and a recorder tone signal line 37 from call progress decoder 26 to dial keyboard 15. A LO control signal applied at node 32 causes transmission gates 33 and 34 to assume an open, high impedance, condition preventing signals from flowing therethrough over lines 36 and 37. This same LO control signal is fed through an inverter 38 to another transmission gate 39. The resulting HI control signal applied to transmission gate 39 causes this gate to convey a HI dial tone signal from call progress decoder 26 over line 41 to another transmission gate 42. This HI signal causes transmission gate 42 to conduct, thereby providing a line connection 43 between lines 36 and 37 at the output side of redial initiation circuit 31. Lines 36 and 37 address, respectively, row four and column one of keyboard 15. Connecting these lines 36 and 37 is the electrical equivalent of pressing redial button 22 sending a redial signal to redial memory 16 over line 23.

Redial memory 26 is thus caused to output a dial pulse signal over lines 18, 20 and 14 to the telephone line 11, all in response to call program decoder 26 having detected a dial tone on telephone line 11. Transistors 19 and 21 are normally conducting and remain so unless signalled to open by a second redial circuit, the redial interrupt circuit, depicted within dot and dash line box 45.

If it is desired to completely bypass redial initiation circuit 31 this can be accomplished by providing a HI control signal to node 32. This signal turns transmission gate 39 OFF and turns transmission gates 33 and 34 ON with the result there are provided two direct signal passages through circuit 31 via lines 36 and 37.

It will be noted that the redial initiation circuit 31 is made of a group of logic gates which can be easily and inexpensively provided by a CMOS transistor integrated circuit in package form.

The purpose of redial interrupt circuit 45 is a supply a LO voltage signal over line 46 to the base of transistor 19 and, in turn, to the base of transistor 21 to open the circuit over line 14 to telephone line 11, i.e. produce an "on hook" condition for the telephone instrument. The redial interrupt circuit 45 is capable of performing this function whenever it detects a busy tone signal from call progress decoder 26 and whenever the busy number has been redialed a predetermined number of times. The redial interrupt circuit 45 includes timer means 47 for measuring "on hook" time following interruption of the circuit through lines 18 and 20 and for automatically reactivating the redial sequence after a predetermined time has elapsed. This time period can be of any length the caller desires from a minimum of about two seconds, which is the time required for the telephone company switching equipment to detect an "on hook" condition. In this function of the redial interrupt circuit 45 the call to the busy number is automatically interrupted and the number redialed upon expiration of the time period for which timer means 47 has been set.

The redial interrupt circuit 46 also includes counter means 48 for measuring the number of times the busy number has been redialed and for completely interrupting the redial sequence until a new number is dialed from the instrument. This function is dictated by government requirements that a number not be redialed more than fifteen times.

Redial interrupt circuit 45 is maintained in an active, or "ON", state by a LO voltage level control signal applied to node 49. This LO voltage signal is supplied to a transmission gate 50 connecting output line 46 with input line 51. This LO signal turns transmission gate 50 OFF, disconnecting lines 51 and 46 from each other. A HI voltage signal applied at node 49 has the effect of turning transmission gate 50 ON providing a clear signal path through the redial interrupt circuit 45, thereby disabling this circuit.

The control signal applied at node 49 is also supplied through an inverter 52 to another transmission gate 53. A LO signal applied at node 49 thus becomes a HI signal capable of turning transmission gate 53 ON. This inverted signal is also supplied to another transmission gate 54 causing it to be turned ON. Thus, in normal operation of redial interrupt circuit 45 transmission gates 53 and 54 are ON and transmission gate 50 is OFF.

Redial interrupt circuit 45 interrupts redialing activity in response to a busy tone signal from call progress decoder 26 in the following manner. The busy tone signal, a HI signal, is conveyed to an OR gate 55 via line 56. The output signal from OR gate 55, which is HI when any of the inputs to the gate are HI, is conveyed over line 51, and via a bypass line 57 through transmission gate 53 to a NOR gate 58. If any input to NOR gate 58 is high its output is LO. The resulting LO output from NOR gate 58 is conveyed via output line 59 to line 46 and hence to the base of transistor 19 which turns OFF in response to the LO signal, terminating the redialing effort. In this manner, a busy tone signal entering redial interrupt circuit 45 over line 56 from call progress decoder 26 puts the telephone instrument in an "on hook" condition.

For automatic redialing, of course, the redialing sequence must be reinstituted after a short period of time, all without any further effort on the part of the caller. This is where the timer means 47 in the redial interrupt circuit comes into play. It will be noted that the HI signal passing through transmission gate 53 also is supplied through transmission gate 54 over line 60 to the timer means 47. The timer means is thereby activated to measure the period of time which has elapsed since the busy tone signal was received from call progress decoder 26 and the telephone was placed in an "on hook" condition. When first activated, timer means 47 sends a HI signal over line 61 to the input of OR gate 55. Thus, simultaneously with the establishment of an "on hook" condition and discontinuance of the HI busy tone signal to OR gate 55 that gate receives another HI signal from timer means 47 and the OR gate 55 continues to output a HI signal maintaining the "on hook" condition. After timer means 47 has measured the predetermined period of time for which it is set it sends a LO signal over line 61 to the input of OR gate 55. The output from OR gate 55 then goes to LO and the output from NOR gate 58 goes to HI and transistor 19 and 21 become conductive, reestablishing an "off hook" condition. When the redial initiation circuit 31 detects a dial tone signal from call progress decoder 26 redial memory 16 is reactivated to redial the number in the memory.

With the discontinuance of a HI signal to the timing means 47 the timing means resets itself to zero in preparation for measuring the next "on hook" period established by redial interrupt circuit 45.

For the reason mentioned previously, the sequence of automatic redials of any particular number must be interrupted at the fifteenth redial. This interruption is accomplished by counter means 48. Each time a HI signal is transmitted by transmission gate 53 signaling detection of a busy signal, this same HI signal is transmitted via line 62 to counter means 48 so that the counter may count the number of redials. When the counter means 48 has counted 15 redials it sends a HI signal to the input of NOR gate 58 causing that gate to emit a LO signal to the base of transistor 19. Counter means 48 maintains this LO signal to terminate automatic redialing until the counter means is reset to zero by a signal from keyboard 15 over lines 17 and 63 indicating that a new number has been entered into the keyboard. Thereafter, the automatic redialing procedure can be reestablished.

Again, it is to be noted that the redial interrupt circuit 45, like the redial initiation circuit 31, can be fabricated inexpensively as a CMOS transistor integrated circuit.

What is claimed is:

1. An automatic redialing system for telephones comprising a call progress decoder for detecting and generating signals in response to a dial tone and a busy tone on the telephone line, a redial memory capable of generating a dial pulse signal corresponding to the called number stored therein, and logic circuitry connecting said call progress decoder and said redial memory, said circuitry comprising a redial initiation circuit responsive to a dial tone output signal from the call progress decoder for signaling the redial memory to initiate a dial pulse signal, and a redial interrupt circuit responsive to a busy tone signal from the call progress decoder for signaling an interruption to the redialing sequence, said redial interrupt circuit including timing means for temporarily interrupting the dialing sequence for predetermined periods of time between redials and counter means for interrupting the redialing sequence after said called number has been redialed a predetermined number of times, said redial interrupt circuit further comprising an OR gate receiving input from the busy tone signal outputted from said call progress decoder and from said timer means, the output of said OR gate being connected to the input of a NOR gate, the other input of said NOR gate being connected to said counting means, the output of said NOR gate being employed to interrupt said redial sequence.

2. The redialing system of claim 1 further characterized in that said redial initiation circuit includes a transmission gate adapted to be turned on by the dial tone signal to cause said redial memory to initiate a dial pulse signal.

3. The redialing system of claim 1 further comprising a transistor switch between the redial memory and the line to which the telephone instrument is connected, and the output from said NOR gate is used to control said transistor switch.

* * * * *